(12) United States Patent
Tobias

(10) Patent No.: US 7,069,979 B2
(45) Date of Patent: Jul. 4, 2006

(54) PHASE CHANGE HEAT SINK FOR USE IN ELECTRICAL SOLENOIDS AND MOTORS

(75) Inventor: Lee A. Tobias, Laguna Niguel, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 720 days.

(21) Appl. No.: 10/123,418

(22) Filed: Apr. 17, 2002

(65) Prior Publication Data

US 2002/0164277 A1 Nov. 7, 2002

Related U.S. Application Data

(60) Provisional application No. 60/287,719, filed on May 2, 2001.

(51) Int. Cl.
F28D 15/00 (2006.01)
F28D 17/00 (2006.01)

(52) U.S. Cl. .................... 165/104.33; 165/104.23; 165/10; 417/438

(58) Field of Classification Search ........... 165/104.23, 165/10, 905; 62/3.1, 3.2; 417/322, 438
See application file for complete search history.

(56) References Cited

U.S. PATENT DOCUMENTS

| | | | |
|---|---|---|---|
| 2,722,616 A | 11/1955 | Moses | |
| 3,075,107 A | 1/1963 | Eis | |
| 3,215,194 A | 11/1965 | Sununu | |
| 3,565,167 A | 2/1971 | Eder | |
| 3,882,335 A | 5/1975 | Fries | |
| 4,118,646 A | 10/1978 | Fleming | |
| 4,295,067 A | 10/1981 | Binder | |
| 4,366,857 A * | 1/1983 | Mayer | 165/104.23 |
| 4,396,055 A | 8/1983 | Mitchell | |
| 5,140,204 A | 8/1992 | Cashmore | |
| 5,699,668 A | 12/1997 | Cox | |
| 6,886,331 B1 * | 5/2005 | Joshi | 417/322 |

FOREIGN PATENT DOCUMENTS

| | | |
|---|---|---|
| GB | 1283332 | 7/1972 |
| GB | 1464766 | 2/1977 |
| JP | 60-125138 | 4/1985 |
| SU | 1490416 | 6/1989 |

* cited by examiner

Primary Examiner—Ljiljana Ciric
(74) Attorney, Agent, or Firm—Andrew C. Aitken; Venable LLP

(57) ABSTRACT

A method, and a system for reducing the internal temperature of an electrical solenoid or motor device involves placing a heat absorbing phase change material (PCM) in intimate contact with the device to reduce the internal temperature of the device. The PCM material reduces the internal operational temperature of the device by undergoing an endothermic phase transition in an operating temperature range of the device. The PCM material transitions between a solid phase and a liquid phase in the internal operational temperature range of the device, or between a liquid phase and a gaseous phase in the internal operational temperature range of the device. The PCM material can be affixed externally to the device. For example, the PCM material is affixed in the form of externally placed pads to the device. The PCM material can also be affixed inside of the device. For example, the PCM material is placed in a potted position around and inside of coil windings of the device, or within an outer structure of the device.

12 Claims, 5 Drawing Sheets

$P_{IN} = H_{OUT} + \Delta H\ STORED + W_{OUT}$

PHASE CHANGE HEAT SINK FOR USE IN ELECTRICAL SOLENOIDS AND MOTORS

This application claims the benefit of Provisional application No. 60/287,719, filed May 2, 2001.

BACKGROUND OF THE INVENTION

1. Field of the Invention

The following invention relates generally to electrical solenoids and motors, and more specifically to reducing internal heating of electrical solenoids and motors during operation.

2. Related Art

Electromagnetic solenoids and motors produce internal heating during operation. This internal heating is due to electrical power dissipated in resistive heating of magnetic coils, as well as frictional losses, inside the device. This internal heating is detrimental to device performance in that it produces an increased operating temperature. Many materials used in the conductors, insulation, and other working parts of these devices are adversely affected by increased temperature. Therefore, maintaining low operating temperatures would simplify design, lower cost, and benefit device life and performance levels.

The performance and reliability of electrical solenoids and motors are diminished by increased internal temperatures caused by waste power dissipation. The internal temperature increase causes the electrical resistance of the electromagnet coil windings to increase for all practical conductor materials. Practical conductor materials include aluminum, copper, silver, gold, and other materials. Given a fixed device supply voltage, which is usually the case, the solenoid or motor windings carry less current as their resistance increases. This reduced current results in less electromagnetic force produced by the coils, and therefore useful work being generated by the device. In this way, solenoids and motors become less powerful as they heat up due to internal power dissipation leading to unmitigated temperature rise in the electromagnet windings.

Today, this operational performance limitation is normally compensated by over-sizing the motor or solenoid such that it provides excess force or power at the start-up condition, as well as the required force or power at the hot (thermally-degraded) operating conditions. Devices designed for steady-state operation must rise to a temperature at which the rate of heat rejection to the environment equals the rate of waste heat input. Devices designed for low duty cycle, or short-duration, operation also rely on a large internal thermal capacity of the device itself to limit the temperature rise to safe levels. What is required is a method, and system accompanying this method, for significantly reducing these deleterious effects of the internal heating of electromagnetic solenoids, motors, and similar devices, without resorting to over-sized devices, or devices that are excessively difficult and expensive to manufacture.

SUMMARY OF THE INVENTION

The present invention is directed to a system (and accompanying method) for reducing the internal temperature of an electrical solenoid or motor device. The method involves placing a heat absorbing phase change material (PCM) in intimate contact with the device to reduce the internal temperature of the device. The PCM material reduces the internal operational temperature of the device by undergoing an endothermic phase transition in an operating temperature range of the device. In one embodiment, the PCM material transitions between a solid phase and a liquid phase in the internal operational temperature range of the device. The PCM material can also transition between a liquid phase and a gaseous phase in the internal operational temperature range of the device.

In one embodiment, the PCM material is affixed externally to the device. For example, the PCM material is affixed in the form of externally placed pads to the device. In another embodiment, the PCM material is affixed inside of the device. For example, the PCM material is placed in a potted position around and inside of coil windings of the device, or within an outer structure of the device. In one embodiment, the outer structure is a flexible, bellows-resembling structure.

The above objects and advantages of the invention or illustrative, and not exhaustive, of those which can be achieved by the invention. Thus, these and other objects and advantages of the invention will be apparent from the description herein, both as embodied herein and as modified in view of any variations which will be apparent to those skilled any art.

BRIEF DESCRIPTION OF THE FIGURES

The present invention will be described with reference to the accompanying drawings, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

I. Introduction

In the following description of the preferred embodiments, reference is made to the accompanying drawings which form a part hereof, and in which are shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

II. Overview of the Invention

The present invention places a phase change material (PCM) heat-absorbing material in intimate contact with the structure and/or heat-producing components of the device. This can be achieved by means of potting selected components in the PCM material or by affixing external PCM "packs" external to the device. The "PCM" heat absorbing material cited in this disclosure undergoes an endothermic (energy-absorbing) phase transition (usually melting) in the operating temperature range of the device.

This phase transition absorbs energy (latent heat) at constant temperature when the temperature of the PCM material is raised to the phase transition temperature. The effect of this process is to absorb waste heat from the device using the PCM such that waste heat is absorbed at constant temperature (without further temperature rise in the device). This condition holds true until all of the PCM has phase transitioned. After this point the PCM material acts as a simple thermal capacitance.

Because a significant amount of heat is associated with the phase transition at constant temperature, a large portion of the heat absorbed in the heating of the PCM is "stored" in the latent heat of the phase transition and therefore does not manifest itself as a large bulk temperature rise. In current state-of-the-art designs (not using the inventive PCM heat sinks) almost all of the waste heat produced in the device results directly in a large temperature rise for the device.

Similarly, on cool-down the PCM heat sink discharges heat when the downward phase transition (freezing) temperature is reached. In this scenario, the PCM acts as "heater" tending to maintain the assembly at the transition temperature until all of the material present has transitioned. This behavior will tend to moderate the rate of cooling of the device and thereby maintain a more steady operating temperature.

III. Detailed Description of the Invention

Figure 1:
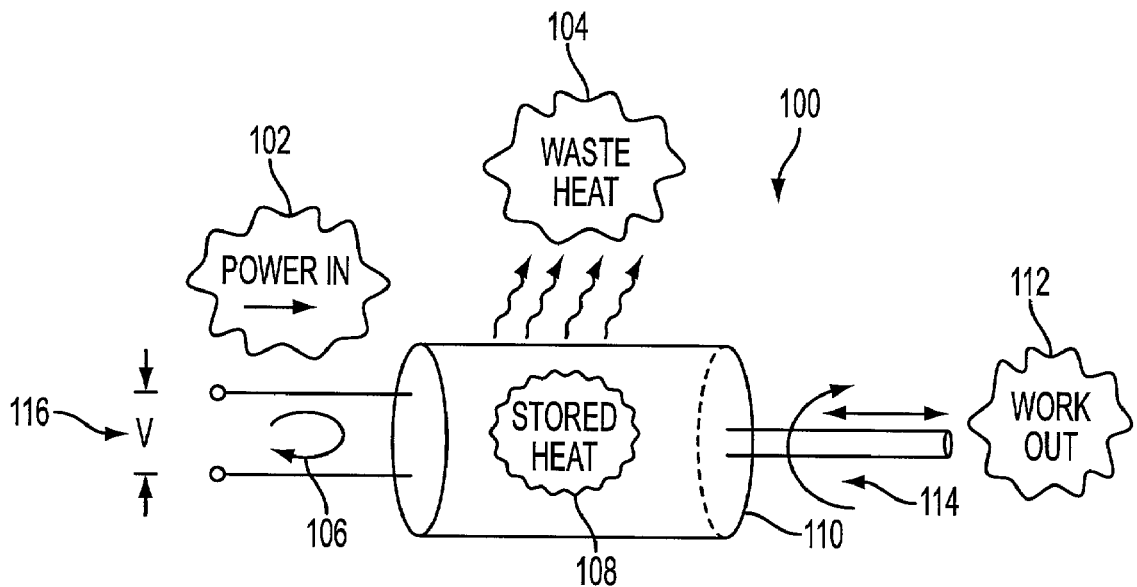
FIG. 1 illustrates heat flow for an electrical actuator system.

The present invention is better understood in view of the following figures. FIG. 1 illustrates heat flow for an electrical actuator system 100. FIG. 1 includes power input 102, voltage 116, current 106, electrical actuator 110, stored heat 108, waste heat 104, work output 112, and shaft 114.

When a voltage differential 116 is applied across the input leads, a current 106, having an associated power input 102, is generated. Current 106 flows through a loop, going into and returning from electrical actuator 110. The electrical actuator can be for example a rotary device (for example a motor) or a linear shaft device (for example a solenoid). The power input 102 is converted into three types of energy. The current 106 is used to generate an electromagnetic field inside device 110, that creates work output 112, which is a physical movement of shaft 114. The second type of energy is waste heat 104, which is heat dissipated from the outer regions of device 110 to the environment. Finally, the device 110 functions as a resistor that absorbs heat, so that some of the power input 102 is converted to stored heat 108.

Figure 2:
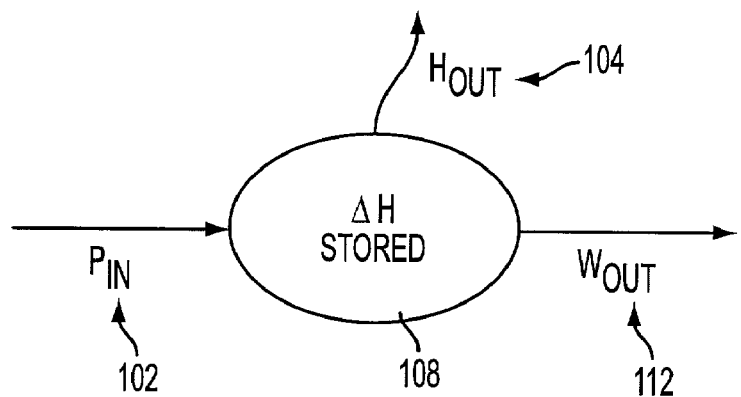
FIG. 2 illustrates formulaically the transfers of energy for an electrical actuator system.

FIG. 2 illustrates formulaically the transfers of energy 200. System 200 includes power input 102, stored heat 108, work output 112 and output heat 104. Power 102 ($P_{in}$) goes into a node (representing device 110), and comes out as (1) stored heat 108 ($\Delta H_{stored}$), (2) work output 112 ($W_{out}$) and (3) output heat 104 ($H_{out}$). The following equation represents the transaction $$P_{in} = H_{out} \Delta H_{stored} + W_{out}$$

Solving the equation for the stored heat, the following is provided $$\Delta H_{stored} = P_{in} - H_{out} W_{out}$$

For stalled or non-moving motors, the work output 112 ($W_{out}$) becomes zero, leaving the stored heat as $$\Delta H_{stored} = P_{in} - H_{out}$$

Therefore, for stalled or non-moving motors, it is essential that the power be dissipated quickly as output heat 104 ($H_{out}$), else the internal heat (stored heat 108 ($\Delta H_{stored}$)) can quickly damage the electrical actuator device 110. Unfortunately, generally, $H_{out}$ cannot increase rapidly enough to accommodate the power in (or heat input pulse), causing stored heat ($\Delta H_{stored}$) to build up and damage the device 110.

Figure 3:
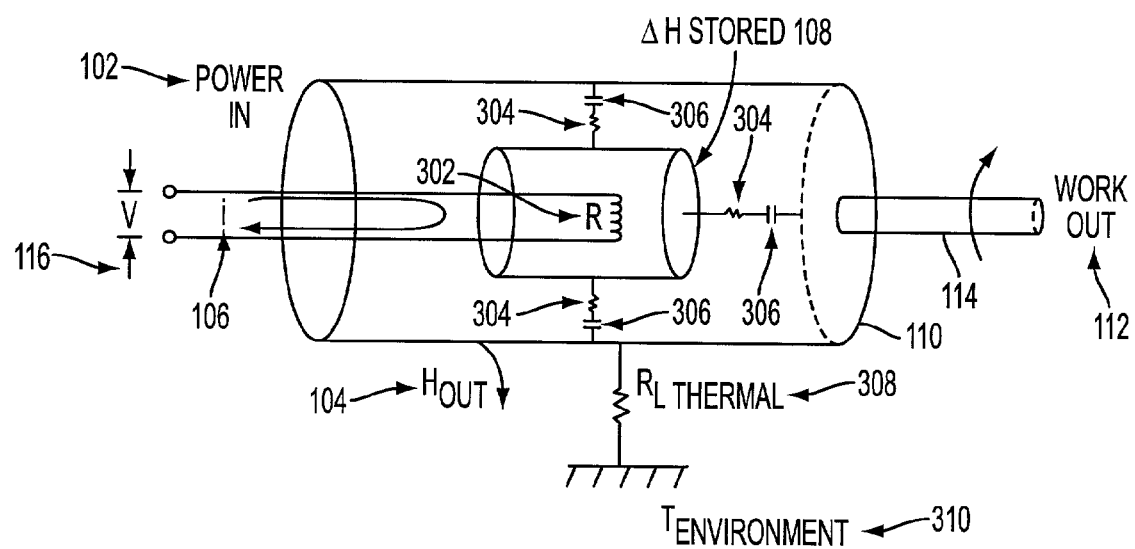
FIG. 3 illustrates a detailed version of the electrical actuator system of FIG. 1.

The same phenomenon is true for short duration pulses, or short time input power events. When a short duration pulse is applied to device 110, it takes time for $H_{out}$ 104 to be dissipated from the device 110. FIG. 3 illustrates system 300, a detailed version of system 100 of FIG. 1. System 300 includes power input 102, voltage 116, current 106, electrical actuator 110, stored heat 108, waste heat 104, work output 112, and shaft 114.

For short duration pulses, $H_{out}$ 104 is essentially a "lazy" process, because it takes relatively long time for the heat pulse to propagate spatially through, and be dissipated from, the device. The amount of mass in the device (110) that is absorbing the rapidly delivered waste power (102-104-112) as stored heat 108 ($\Delta H_{stored}$) is essentially the induction coil of the device, itself, and the few components around it. The rest of the mass of the device 110 or the actuator around it is not used during absorption of short pulses, resulting in the concentration of a relatively large amount of heat in a small mass. This causes a large temperature rise in the core components of the device (110) due to the constant specific heat of the material, which results in a fixed ratio of temperature rise per unit heat input for the device. Since $H_{out}$ 104 cannot be dissipated quickly enough for short duration pulses, stored heat 108 ($\Delta H_{stored}$) builds up.

FIG. 3 shows how device 110 is modeled by circuit components. Specifically, device 110 is modeled as (1) an internal resistor 302 (where the core of the windings are, which dissipates power input 102 into the device 110), (2) thermal resistance 304 (shown between the core of the actuation device (where the windings are) and the outer body parts and actuator housing); (3) thermal capacitances 306 (the product of the mass of a part and the specific heat of the part, indicating the amount of heat moved into the part that will create a given temperature rise manifest in that part); (4) second thermal resistance 308 between the housing and the environment surrounding the housing, which dissipates a portion of power input 102 as heat out 104 ($H_{out}$); and (5) environmental temperature 310, represented as a ground connection. The driving potential for heat flow from the device is temperature drop from the core of 110 to the environment 310. Hence, these are rate limited transport processes that are thermal in nature, associated with the shown resistor/capacitor networks. Thermal isolation between the source of the heat and the outside world (the ultimate destination for the heat) occurs if there is a loading application of power or a surge of power. The heat cannot drain to the environment rapidly enough, causing a temperature change that cannot be quickly enough diffused.

Figure 4:
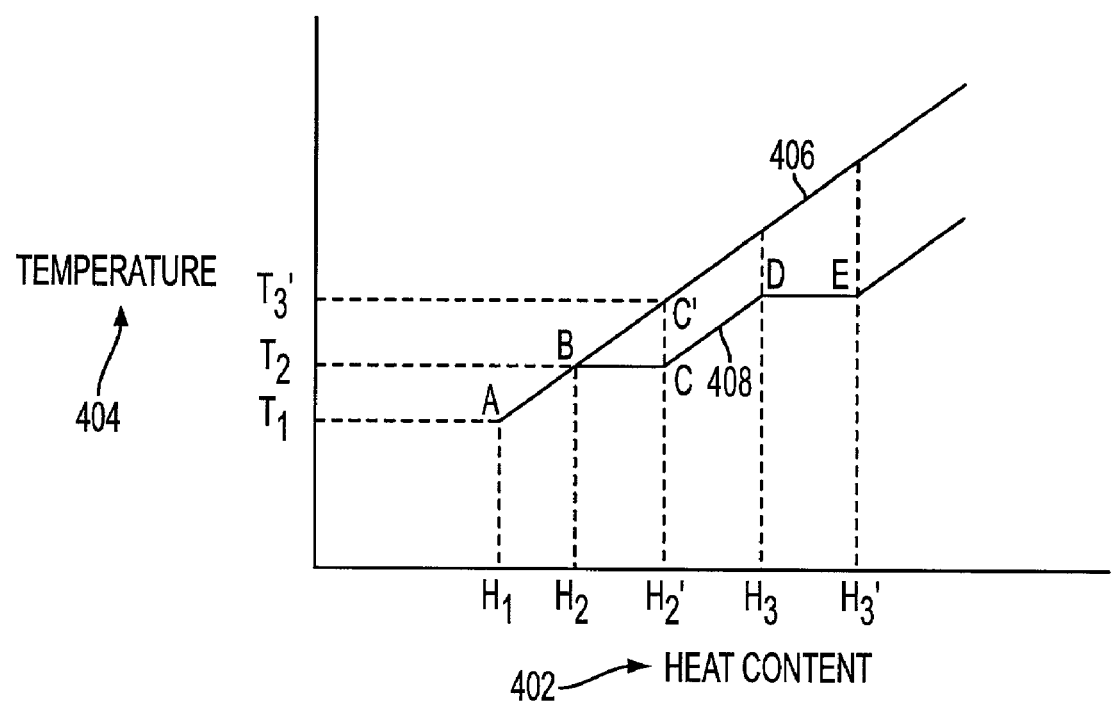
FIG. 4 illustrates a state change, heat-to-temperature comparison.

FIG. 4 illustrates a state change, heat-to-temperature comparison. The heat content 402 is the abscissa, and the temperature 404 is the ordinate (function of the heat content). Heat content 402 begins at absolute zero, which is 0 degrees Kelvin, or alternatively −273 degrees Centigrade.

Line 406 illustrates the temperature to heat content relationship for a material that does not have phase changes for the temperatures shown. For example, line 406 is the temperature to heat relationship for a block of copper, which comprises the coil windings of device 110. On the other hand, line 408 is the temperature to heat relationship for a phase change material (PCM) heat-absorbing material used in the present invention. The PCM is in intimate contact with the structure and/or heat-producing components of device 110. For example, in an embodiment of the present invention, the PCM is interwined around the coil windings to alter the average temperature vs. heat content response of the assembly. This can be achieved by means of potting selected components in the PCM material or by affixing external PCM "packs" externally to the device such that when the PCM undergoes an endothermic (energy-absorbing) phase transition in the operating temperature range of the device 110.

Referring to line 406 for a normal copper winding, the temperature increases linearly (from t=0 to t=T1 (point A) to t=T2 (point B) to t=T2' (point C')) as the heat increases (from h=0 to h=H1 to h=H2 to h=H2'). This response (a normal copper winding) to an increase in heat content by the input power being dissipated internally occurs according to the Ohmic heating equation-$i^2R$ (current, squared, times the resistance equals power). The result is a temperature rise directly proportional to the amount of heat dissipated.

On the other hand, the PCM material undergoes a phase change in the same temperature range. Referring to line 408, the temperature rises linearly from a temperature of t=0 to t=T1 (point A) to t=T2 (point B) as the heat changes from h=0 to h=H1 to h=H2. However, between h=H2 and h=H2', the temperature remains constant at t=T2 even though the heat content of the PCM has increased. The reason for this effect is that during this heat change, the PCM material is undergoing a phase change, from a solid to a liquid material, and the PCM material is actually absorbing heat until it is converted from a completely solid form (at h=H2) into a completely liquid form (at h=H2').

As illustrated, from h=H2' (point C) to h=H3 (point D), the temperature of the pure liquid again rises linearly (from t=T2 to t=T2') with the heat input. This occurs until another phase change of liquid to gas occurs at h=H3 (point D). Once again, the PCM material undergoes a phase change, from a liquid to a gaseous material, with the PCM material absorbing heat until it is converted from a completely liquid form (at h=H3) into a completely gaseous form (at h=H3', at point E). Once the heat content reaches h=H3', the PCM material is completely gaseous, and takes on the linear temperature to heat characteristic once again.

In the present embodiment, the characteristics of the PCM material and the operational temperatures of the device are chosen such that the PCM material goes from a solid to a liquid form during operation. Thus, the invention uses the solid-to-liquid PCM phase change to reduce the internal heat of device 110. However, those skilled in the art will recognize that the liquid-to-gaseous phase change can be used to reduce the internal heat as well, and thus the PCM material and the operational temperatures can be chosen appropriately.

Figure 5A:
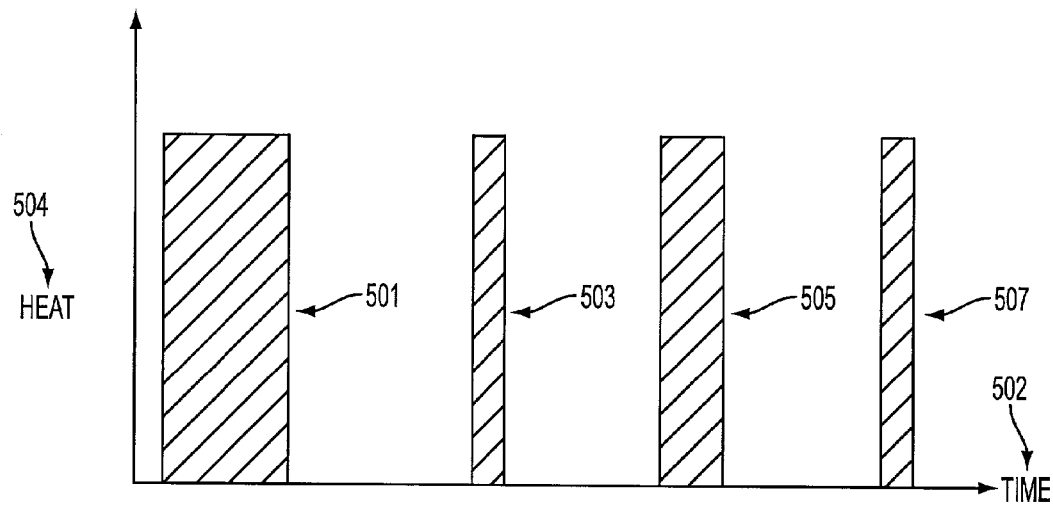
FIGS. 5A and 5B illustrate respectively (i) the heat pulses of an intermittently loaded heat pump, and (ii) a comparison of system performance with phase change material (PCM) material versus system performance without PCM material.

FIG. 5A illustrates the heat input pulses of an intermittently powered electrical actuator. (As shown below, FIGS. 5A and 5B correspond to FIG. 4.) FIG. 5A illustrates time as the abscissa 502, and the heat load as the ordinate 504. Heat pulses 501, 503, 505 and 507 are illustrated. The actuator system can accept input power pulses of various duration, including very high, short duration pulses. These produce very high waste power levels, for short periods of time, until a next command or input power is applied.

Figure 5B:
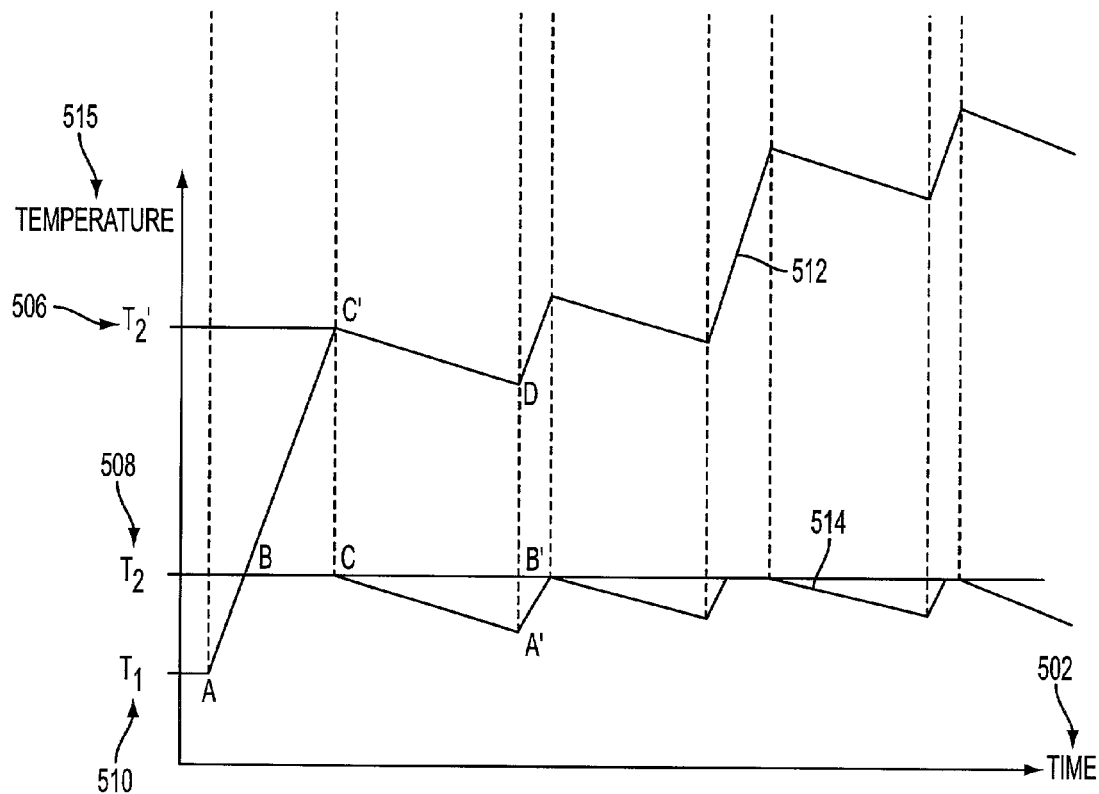

FIG. 5B compares how the system performs with the PCM material to how the system performs without the PCM material. FIG. 5B also illustrates the time as abscissa 502, and the temperature as the ordinate 515. The performance of the system without PCM material is labeled 512. The performance of the system with the PCM material is labeled 514. Beginning at the start temperature 510, when heat pulse 501 is applied, non-PCM line 512 increases rapidly to point B (at temperature T2), then to point C' (at temperature T2'). Subsequently, the cooling is similarly rapid, from point C' to point D. Before the cooling continues, however, another heat pulse 503 is applied, causing another rapid increase in temperature to well beyond temperature T2'. This pattern of heating and cooling continues for the remaining heat pulses, so that the internal temperature of the motor never decreases to the range of the start temperature (temperature T1 for point A), and fluctuates rapidly.

Referring to the performance with PCM added, namely line 514, the internal temperature of the motor fluctuates much less rapidly. Beginning with the initial pulse 501, the temperature of the system rises until point B (at temperature T2), and then levels off to point C. The leveling off is caused by the fact that heat of transition phase (either associated with the PCM material transitioning from the solid phase to the liquid phase, or instead transitioning from the liquid phase to the gaseous phase) is being absorbed. During the transition phase, the temperature of the PCM material remains constant at the T2 phase transition temperature, which causes the temperature of the motor to stay constant. Normally, the constant temperature would be maintained until all of the PCM material is transformed, at which point the temperature would again increase. However, sufficient heat is not added to convert all of the material. In fact, the material begins to cool after enough time has passed since the last heat pulse was applied. At this time, the temperature of the PCM material (and hence of the motor) begins to decrease back down toward temperature T1 (corresponding to point A) and stops at point A'. When a second pulse 503 is applied, the temperature again increases to T2 (point B' and remains constant at that temperature. The above cycle of heating and cooling is repeated, with a much lower fluctuation and at a much lower temperature as for line 512.

Figure 6:
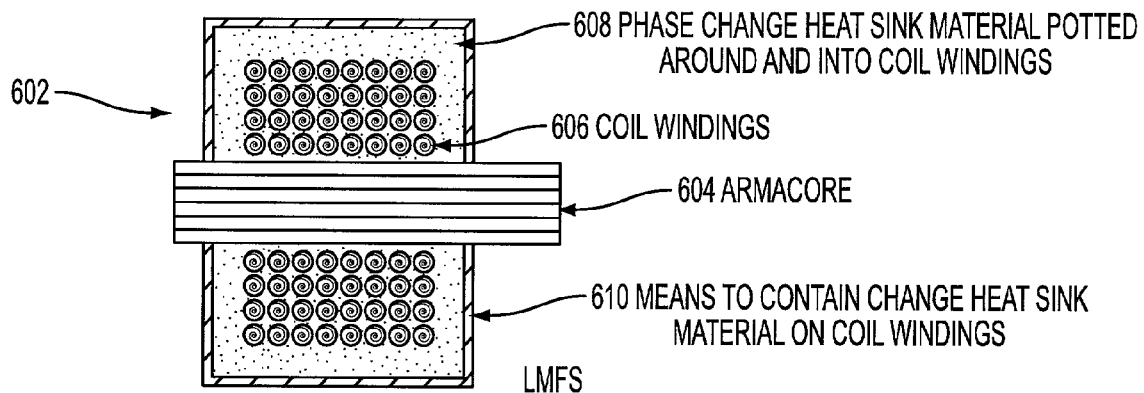
FIG. 6 illustrates an actuator assembly with PCM material, having an armature and solenoid coil windings.
Figure 7:
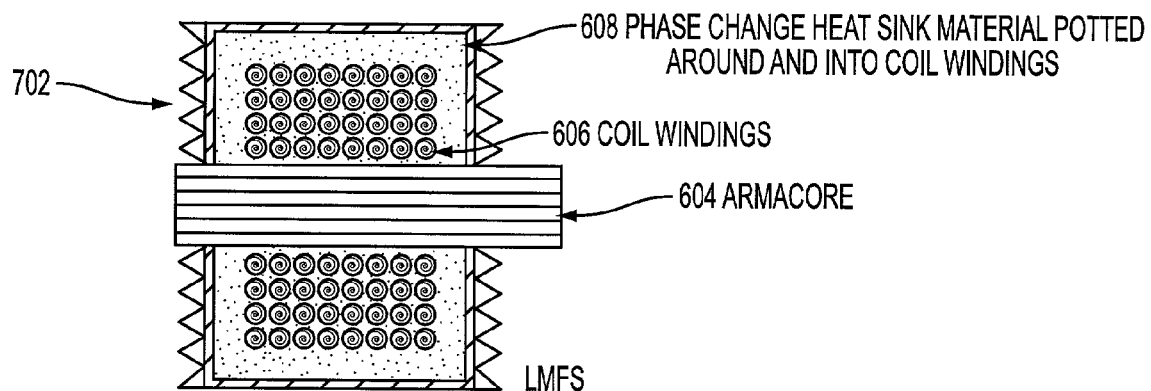
FIG. 7 illustrates the same structure as FIG. 6, with the addition of PCM material contained in a bellows-like (or other flexible) structure.

FIGS. 6 and 7 illustrate the relationship between exemplary solenoid coil windings, the PCM material and the PCM material containment means in exemplary embodiments for the present invention. FIG. 6 illustrates an actuator assembly 602 having an armature 604 and solenoid coil windings 606. Surrounding the coil windings is the PCM material, some potted around and into the coil windings, and some placed on the coil windings (608). PCM material 608 invades the interwinding void spaces and replaces the low thermal capacitance and thermally insulated air which normally fills these spaces. Additional quantities of the PCM 608 are placed on the inside and outside periphery of the solenoid coil envelope. A rigid container 610 is provided to contain the PCM material in the assembly 602. FIG. 7 illustrates the same structure as FIG. 6, with the addition of PCM material in a bellows-like (or other flexible) structure 702 in lieu of the rigid Structure 610 of FIG. 6. Structure 702 can be a sealed plastic or metallic cup, with a flexible structure to contain additional PCM material. In one embodiment, the PCM is placed to optimize the thermal behavior of the solenoid or motor, to mitigate thermal performance degradation in a given operating environment. This operating environment can be a space, near space, or terrestrial environment.

The added thermal capacity represented by the latent heat of transition of the PCM material will further increase the heat capacity of the solenoid, and thereby reduce the temperature rise observed in operation. Reduction in the temperature rise of a magnetic solenoid will allow the coil designer to reduce the size, weight and likely cost, of the coil specified for a given application due to the insensitivity to internal heating afforded by the added PCM material.

The present invention is envisioned to have particular benefit in short operating duration, high-power electrical solenoids and motors, with small ratios of on-to-off times and high power-to-mass ratio. In these scenarios, the amount and type of heat absorbing material can be sized to absorb the waste heat dissipated during the "on" portion of the cycle (when a heat pulse is applied), then slowly discharge the heat to the surrounding operating environment by re-freezing and cooling during the "off" portion of the cycle (when no pulse is applied). In this way, the PCM heat storage capacity at constant temperature will benefit the solenoid or motor by leveling the operating temperature peaks during the "on" cycles by reducing the temperature peaks (preventing device overheat). This action tends to maintain the device at or near the PCM material phase change temperature across a wide range of operating conditions.

The present invention also has application for high-power short-duration motors and solenoids where the expected operation is for a few (or even a single) operational cycles, resulting in an operating regime scenario where the device never reaches thermal equilibrium. In this embodiment, the PCM heat absorbent will tend to reduce and level the operating temperature rise at the phase change temperature of the PCM material. This temperature leveling will persist until all of the mass of the PCM material has undergone the phase transition. In this scenario, the PCM material can be selected and emplaced in the device such that a minimum temperature rise is attained during the operational time of the device (i.e., all the PCM material phase transitions during the heat-up transient).

While the invention has been particularly shown and described with reference to preferred embodiments thereof, it will be understood by those skilled in the relevant art that various changes in form and details may be made therein without departing from the spirit and scope of the invention.

What is claimed is:

1. A method for reducing the temperature of an electrical solenoid device, an electric motor device, or both, comprising:

placing a heat absorbing phase change material (PCM) in contact with the windings of said device, wherein the PCM material is contained within a housing that further contains said electric solenoid device or said electric motor device; and, wherein said housing is a flexible, bellows-resembling structure which can expand or contract in response to changes in the state of the PCM to reduce the temperature of the device.

2. A method according to claim 1, wherein said PCM material reduces the operational temperature of the device by undergoing an endothermic (heat absorbing) phase transition in a predetermined operating temperature range that is determined for said device.

3. A method according to claim 2, wherein said PCM material transitions between a solid phase and a liquid phase in said predetermined operational temperature range.

4. A method according to claim 2, wherein said PCM material transitions between a liquid phase and a gaseous phase.

5. A method according to claim 1, wherein additional PCM material is further affixed externally to a housing of the device in a contact relationship that permits heat transfer.

6. A method according to claim 5, wherein said PCM material is affixed in the form of externally placed pads to the electric solenoid or electric motor.

7. A system for reducing the temperature of an electrical solenoid device, an electric motor device, or both, comprising:

an outer housing structure that contains said electrical solenoid or electric motor device;

one or more internal components contained within said outer housing structure; and phase change material (PCM) material contained in said housing and in contact with said device to reduce the temperature of the device, wherein said housing structure is a flexible, bellows-resembling structure which can expand or contract in response to changes in the state of the PCM.

8. A system according to claim 7, wherein said PCM material is a material that reduces the operational temperature of the device by undergoing an endothermic phase transition in an operating temperature range of the device, said operating temperature range being predetermined.

9. A system according to claim 8, wherein said PCM material is a material that transitions between a solid phase and a liquid phase in said predetermined operating temperature range of the device.

10. A system according to claim 8, wherein said PCM material is a material that transitions between a liquid phase and a gaseous phase in said predetermined operating temperature range of the device.

11. A system according to claim 7, wherein said PCM material is further affixed externally to said housing of device.

12. A system according to claim 11, wherein said PCM material is affixed in the form of externally placed pads to the device.

* * * * *